United States Patent [19]
Sluiter

[11] Patent Number: 5,806,265
[45] Date of Patent: Sep. 15, 1998

[54] METAL TRUSS JOINING GUSSET

[76] Inventor: Scott E. Sluiter, 4900 168th Ave., Holland, Mich. 49424

[21] Appl. No.: 752,688

[22] Filed: Nov. 19, 1996

Related U.S. Application Data

[60] Provisional application No. 60/010,584 Jan. 25, 1996.

[51] Int. Cl.$^6$ ....................................................... E04C 3/02
[52] U.S. Cl. ............................ 52/643; 52/655.1; 52/690; 52/696; 52/712; 52/745.2
[58] Field of Search ............................. 52/634, 643, 645, 52/647, 654.1, 655.1, 690, 696, 698, 703, 712, 714, 715, 745.1, 745.2; 403/205, 232.1, 237, 403

[56] References Cited

U.S. PATENT DOCUMENTS

| | | |
|---|---|---|
| D. 364,331 | 11/1995 | Leek . |
| 508,280 | 11/1893 | Cavallaro . |
| 528,940 | 11/1894 | Greiner . |
| 792,366 | 6/1905 | Taylor .................... 403/237 X |
| 1,778,854 | 10/1930 | Green . |
| 1,819,970 | 8/1931 | Peden . |
| 1,896,530 | 2/1933 | Trout . |
| 2,300,113 | 10/1942 | Faber . |
| 2,353,039 | 7/1944 | Janiszewski . |
| 2,477,163 | 7/1949 | Barnett . |
| 2,611,160 | 9/1952 | Hanesse . |
| 2,994,415 | 8/1961 | Halle . |
| 3,358,848 | 12/1967 | Johnsson . |
| 3,425,720 | 2/1969 | Spane . |
| 3,481,635 | 12/1969 | Tracy ................... 403/232.1 X |
| 3,596,941 | 8/1971 | Tracy . |
| 4,196,556 | 4/1980 | Russo ....................... 52/714 |
| 4,318,628 | 3/1982 | Mancini . |
| 4,389,829 | 6/1983 | Murphy . |
| 4,410,294 | 10/1983 | Gilb et al. . |
| 4,422,792 | 12/1983 | Gilb . |
| 4,435,940 | 3/1984 | Davenport et al. . |
| 4,498,801 | 2/1985 | Gilb . |
| 4,525,971 | 7/1985 | Kern . |
| 4,561,230 | 12/1985 | Rionda et al. .................. 403/232.1 X |
| 4,616,453 | 10/1986 | Sheppard, Jr. et al. . |
| 4,715,161 | 12/1987 | Carraro et al. ........................ 52/714 |
| 4,748,784 | 6/1988 | Dividoff et al. . |
| 4,817,359 | 4/1989 | Colonias . |
| 4,837,988 | 6/1989 | Menchetti et al. . |
| 4,878,323 | 11/1989 | Nelson . |
| 4,897,979 | 2/1990 | Colonias . |
| 4,982,545 | 1/1991 | Stromback . |
| 4,986,052 | 1/1991 | Nelson . |
| 5,253,465 | 10/1993 | Gilb . |
| 5,263,296 | 11/1993 | Spera .................. 403/237 X |
| 5,341,619 | 8/1994 | Dunagan et al. . |
| 5,438,811 | 8/1995 | Goya ................... 52/698 X |
| 5,617,694 | 4/1997 | Baba ........................ 52/712 |

FOREIGN PATENT DOCUMENTS 18355   6/1975   Australia .

*Primary Examiner*—Lanna Mai
*Assistant Examiner*—Kevin D. Wilkens
*Attorney, Agent, or Firm*—Price, Heneveld, Cooper, DeWitt & Litton

[57] ABSTRACT

A gusset for joining first and second abutting support trusses wherein the gusset comprises a plate having a body portion and a finger portion. The body portion is adapted to be abutted against and fastened to a side of the first support truss at one end thereof and the finger portion is adapted to extend beyond the end of the first truss when the body portion is fastened to the first support truss. The finger portion is further adapted to hangingly engage at least one element of the second support truss for supporting the one end of the first truss thereon without fastening the first truss to the second truss.

13 Claims, 2 Drawing Sheets

5,806,265

METAL TRUSS JOINING GUSSET

This application claims the benefit of U.S. Provisional application Ser. No. 60/010,584, filed Jan. 25, 1996.

BACKGROUND OF THE INVENTION

Structural trusses are used for the fabrication of buildings in the construction industry. The primary application of structural trusses is to define a desired roof line and to support the roof by the building walls and interior structure. Trusses are typically fashioned from a series of joined vertical, horizontal, and angled members. Historically, trusses have been fabricated from wooden members joined by flat metal plates having a plurality of spiked projections therefrom for driving the plates into the wooden members and retaining the members in a joined relationship.

In recent years, metal trusses have gained favor in the construction industry. Metal trusses are typically comprised of metal U-channels and square tubular members with the members being joined by mechanical fasteners.

When added to a building structure, metal trusses are primarily in a parallel spaced apart relationship. However, for hipped roofs or roofs of multiple roof lines and the like, secondary trusses are required for attachment to the primary trusses to give the desired the roof lines. The secondary trusses are joined to the primary trusses by abutting the secondary truss to the primary truss and manually holding the truss in place while angled clips are fastened to the trusses to join the various horizontal or vertical truss members. In practice, mechanical fasteners are installed through each flange of the angled clips thereby resulting in load transference between trusses via fasteners which are installed essentially at right angles to each other. This method of joining trusses results in the undesired inducement of bending movements in the flanges of the angled clips, misalignment of secondary trusses with respect to the primary trusses, and lateral movement and play between trusses as roof loads are applied.

SUMMARY OF THE INVENTION

In the present invention, a gusset is provided for joining trusses wherein the gusset has a body portion for attachment to a first truss and a finger for engaging a flange of a second truss to support the end of the first truss on the second truss until the first truss is permanently fastened to the second truss. This eliminates the need to independently support the first truss in relative position to the second truss while permanently fastening the first truss to the second truss.

DESCRIPTION OF PREFERRED EMBODIMENT

Figure 2:
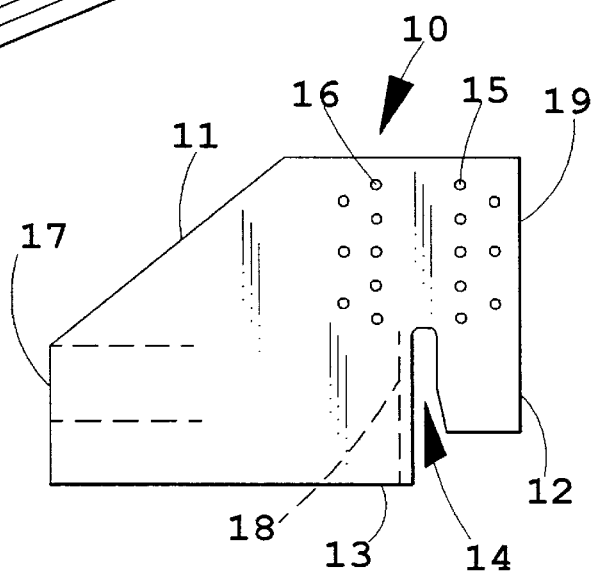
FIG. 2 is a plan view of a metal truss joining gusset for joining metal trusses at substantially right angles.
Figure 3:
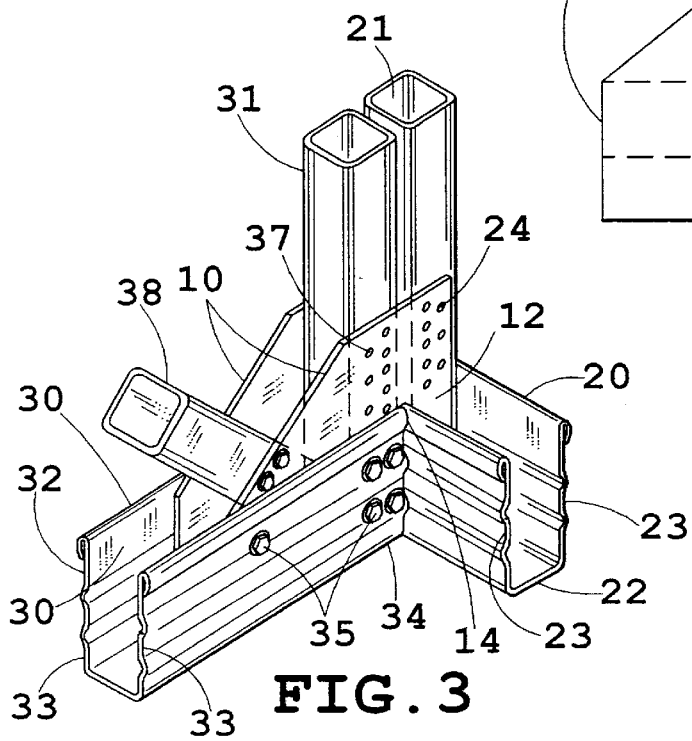
FIG. 3 is a sectional perspective view of a truss joint showing a metal truss joining gusset attaching a secondary metal truss to a primary metal truss.

For purposes of description herein, the terms "upper," "lower," "right," "left," "rear," "front," "vertical," "horizontal," and derivatives thereof shall relate to the invention as oriented in FIGS. 2 and 3. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Within this of description, members of a truss referred to as chords are those horizontal or near horizontal members forming the bottom of the truss and those angled upper members defining a roof line. The truss members extending between chords and maintaining the chords in a spaced apart relationship are referred to as webs.

Figure 1:
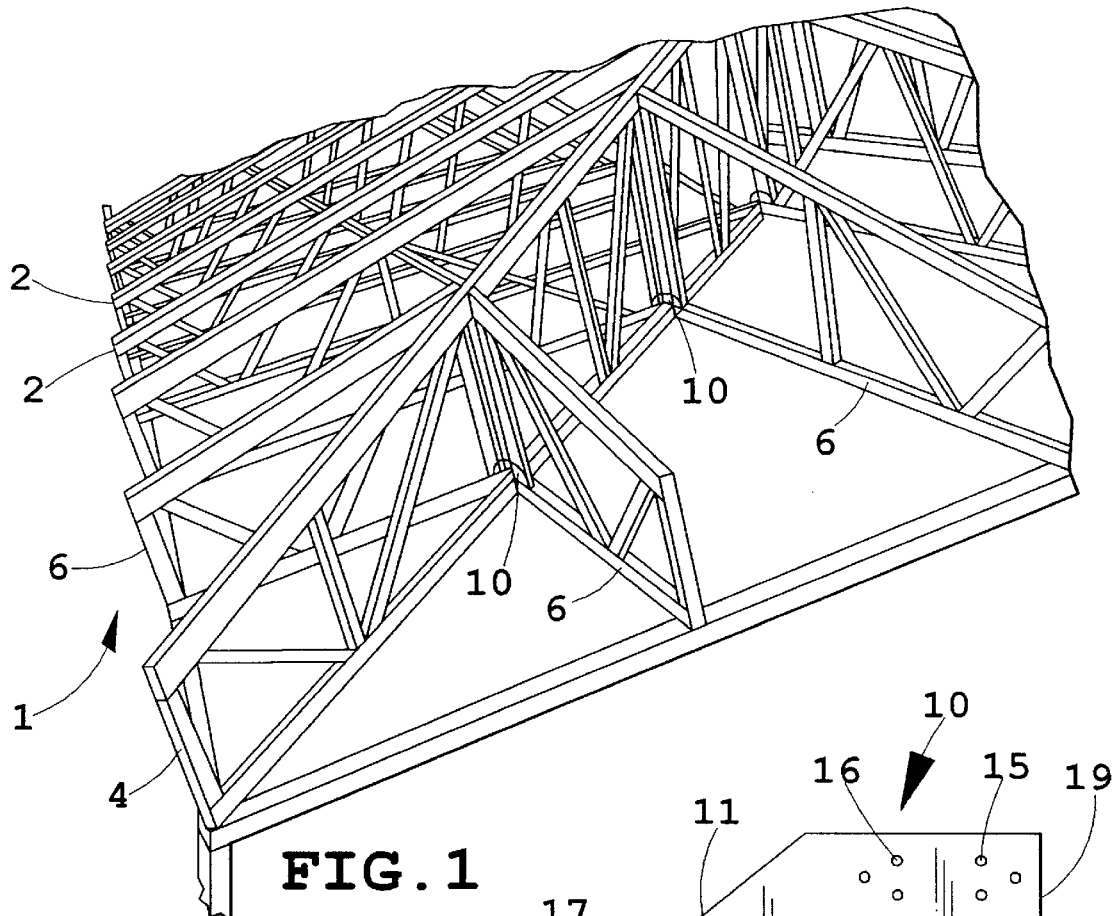
FIG. 1 is a perspective view of a plurality of trusses arranged to support a roof wherein secondary trusses are joined to primary trusses according to the present invention.

Turning to the drawings, FIG. 1 shows a network of trusses shown generally at 1. Primary trusses 2 are generally supported at the ends of the truss by the exterior supporting walls, and, depending upon the internal configuration of a building, the trusses may also be supported at an intermediate point depending upon the internal configuration of the building. Often times, the roof lines of buildings incorporate either multiple roof lines or hipped roofs thereby requiring trusses other than primary trusses to facilitate the alternate roof lines. In creating the multiple roof lines such as the hipped roof shown in FIG. 1, a secondary truss 4 is attached to a primary truss 2 and is oriented at an angle with respect to primary truss 2 to form the desired roof line. Additionally, secondary truss 4 may also act as a primary truss to secondary trusses 6 to complete the truss network for a particular roof. Secondary trusses 6 are mated and attached to truss 4 with gussets 10 positioned at a lower end portion of secondary truss 6 at the point where secondary truss 6 abuts against primary truss 4. Depending on the configuration of the desired roof lines, the secondary trusses may be mated with the primary truss 4 at either right angles or at an angle other than 90° to form the desired roof line.

Referring to FIG. 2, the preferred embodiment of the present invention discloses a gusset 10 comprising a flat metal plate 11 having a finger 12, a depending portion 13, a forward end 17 and an upper portion 19. Depending portion 13 and upper portion 19 generally forming a body of the gusset. Finger 12 and depending portion 13 combine to define slot 14 therebetween. The width of slot 14 is slightly greater than the thickness of upstanding flanges 23 of bottom chord 22 of truss 20 to which gusset 10 is to be mated, and the depth of slot 14 is substantially equal to the length of upstanding flange 23 (FIG. 3). Bottom chord 22 is in the general shape of a U-channel. Gusset 10 has a first hole series 15 in upper portion 19 located substantially in vertical alignment with finger 12. A second hole series 16 is also located in upper portion 19 forward of and in substantially horizontal alignment with hole series 15 and is substantially horizontally equi-distant from slot 14 as is holes series 15. The number of holes in series 15 and series 16 is dependent on the force loads to be transferred between trusses and is therefore application dependent; however, the number of holes in series 15 is typically equal to the number of holes in series 16.

In FIG. 3, two gussets 10 are shown in use joining secondary truss 30 to primary truss 20. Secondary truss 30 is typically comprised of bottom chord 32 in the shape of a U-channel having upstanding flanges 33 and terminating at butt end 34. Co-located at butt end 34 is web 31 typically formed in a square tubular cross-section. Web 31 rests within the U-shaped channel of bottom chord 32. Gussets 10 flank the outer sides of web 31 and also flank the inner sides 36 of upstanding flanges 33 on bottom chord 32 of secondary truss 30. Gusset 10 is attached to secondary truss 30 with fasteners 37 through second hole series 16; fasteners 37 engage both truss web 31 and gusset 10. Similarly, holes are formed through both bottom chord 32 and gusset 10 with fasteners 35 installed therethrough affixing portion 13 of gusset 10 to upstanding flange 33 of bottom chord 30. The number of fasteners 35 again depending on the force loads exerted on trusses 20 and 30. Gusset 10 is formed in a manner such that an angular web 38 extending from the approximate intersection of bottom chord 32 and web 31 can also be attached to gusset 10.

At such time as secondary truss 30 is desired to be joined to primary truss 20, secondary truss 30 is manually positioned relative to primary truss 20 so that butt end 34 of secondary truss 30 is abutted against primary truss 20 and each of gusset plates 10 flank vertical member 21 of primary truss 20. Secondary truss 30 is vertically lowered so that slots 14 in gussets 10 engage the upstanding flange 23 in bottom chord 22 most proximate to secondary truss 30. When flange 23 is fully engaged within slots 14, fingers 12 of gussets 10 extend into the U-section of bottom chord 22, thereby retaining secondary truss 30 in proper registration with primary truss 20 and alleviating the need to manually support secondary truss 30 while attaching secondary truss 30 to primary truss 20. Holes are formed in web 21 in registration with holes 15 and fasteners 24 are thereby installed in holes 15 for permanent attachment of secondary truss 30 to primary truss 20.

Figure 4:
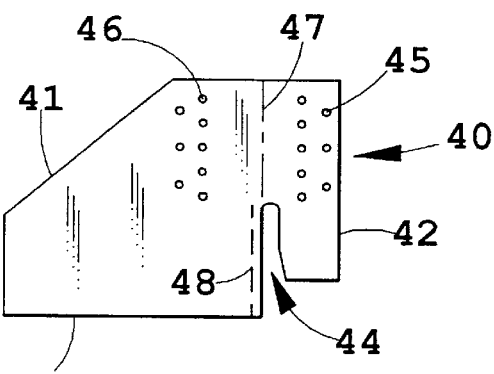
FIG. 4 is an alternate embodiment of the gusset for joining a secondary truss to a primary truss at an angle other than 90°.
Figure 5:
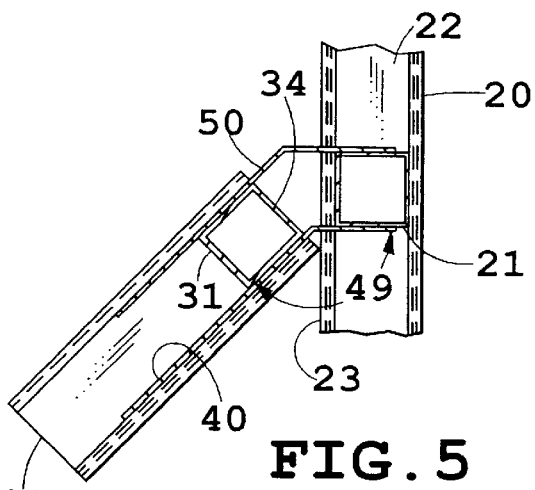
FIG. 5 is a plan view of the gusset joining a secondary truss to a primary truss at an angle other than 90°.

An alternate embodiment 40 of truss joining gusset 10 is shown in FIGS. 4 and 5 whereby gusset 40 is formed in a manner similar to gusset 10 such that plate 41 is bent along bend line 47. Finger 42, and holes series 45 are no longer co-planar with depending portion 43 and holes series 46. Mark line 48 is stamped on at least one side of gusset 40 slightly forward of slot 44 and parallel thereto. In the preferred embodiment, mark line 48 is approximately 3/16 inch forward of slot 44. In use, gusset 40 is mounted to secondary truss 30 in a manner similar to gusset 10 with butt end 34 horizontally aligned with mark line 48 on gusset 40. The purpose of gusset 40 is to mount secondary truss 30 to primary truss 20 at an angle other than 90° and corresponding to angle 49 formed in gusset 40 at bend line 47. Gusset 50 is formed in the same manner as gusset 40; however, the bend line for gusset 50 and the hole series for mounting gusset 50 to web 31 are located farther forward on gusset 50 to accommodate for the geometry of mounting secondary truss 30 to truss 20 at the other than 90° angle. After installation of gussets 40 and 50 on secondary truss 30, slot 44 in gusset 40 and a corresponding slot in gusset 50 and hole series 45 in gusset 40 and the corresponding holes series in gusset 50 are all in alignment to permit engagement of the slots in gussets 40 and 50 with the flange 23 on primary truss 20 and to permit gussets 40 and 50 to flank web 21. Gussets 40 and 50 are then fastened to web 21 in the same manner as gusset 10.

Figure 6:
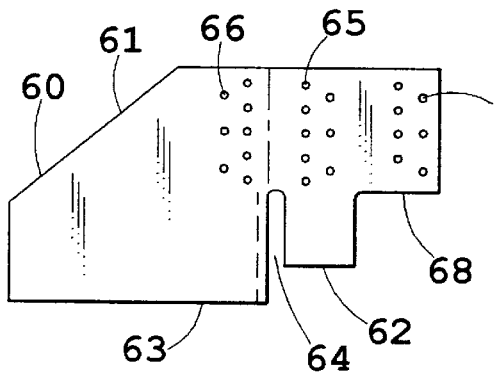
FIG. 6 is an alternate embodiment of the gusset joining a secondary truss to a primary truss and to a second truss adjacent and parallel to the primary truss.

A third embodiment 60 of truss joining gusset 10 is shown in FIG. 6 whereby gusset 60 is formed in a manner similar to gusset 10 with the addition of tabbed portion 68 extending rearward from plate 61. Gusset 60 also has hole series 65 and 66 as does gusset 10 and has a third hole series 67 in tabbed portion 68. Hole series 67 is in substantially horizontal alignment with hole series 65 and 66 and horizontally spaced from hole series 65 to engage a second truss 70 (FIGS. 7 and 8) adjacent to primary truss 20.

Figure 7:
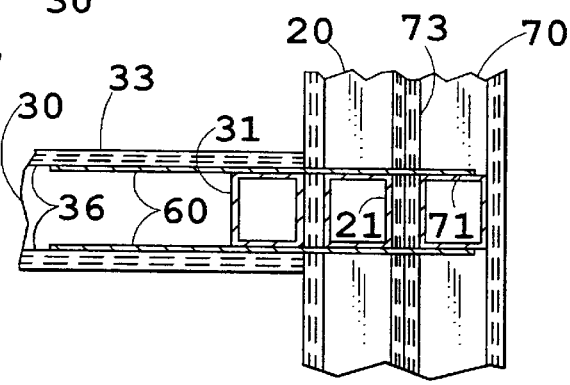
FIG. 7 is a plan view of the gusset joining a secondary truss to a primary truss and to a second truss adjacent and parallel to the primary truss.
Figure 8:
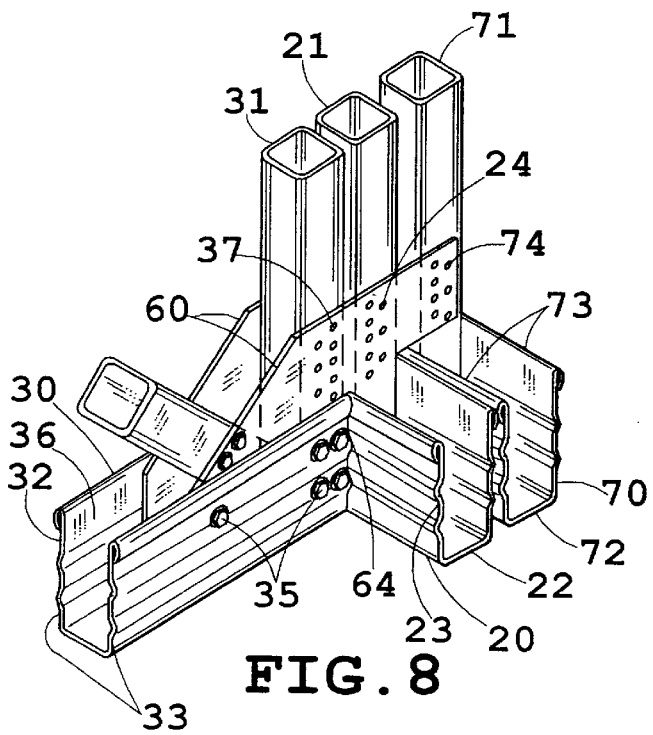
FIG. 8 is a perspective view of the embodiment of the gusset joining a secondary truss to a primary truss and to a second truss adjacent and parallel to the primary truss.
Figure 9:
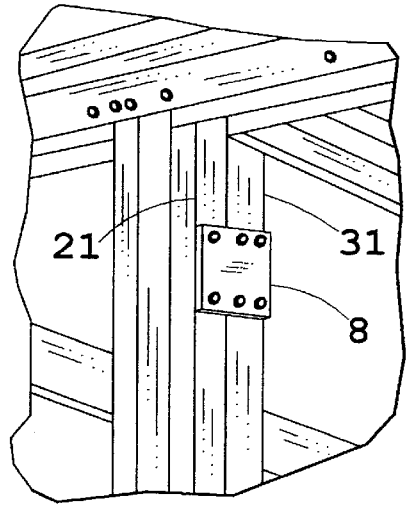
FIG. 9 is a perspective view of an upper portion of trusses joined according to the present invention wherein the upper truss portions are joined with splice plates.

Referring to FIGS. 6–8, gusset 60 is shown in use in joining secondary truss 30 to primary truss 20 and second primary truss 70 at substantially right angles thereto. In use, gussets 60 flank web 31 in secondary truss 30 and are fastened thereto by fasteners 37. Depending portion 63 of gusset 60 flank interior surface 36 of vertical flanges 33 and are fastened thereto by mechanical fasteners 35. Secondary truss 30 is then abutted to primary truss 20 and vertically lowered until vertical flange 23 engages slot 64 in gusset 60. Gussets 60 flank the exterior portions of webs 21 and 71 in trusses 20 and 70 respectively. Holes are then formed in webs 21 and 71 corresponding to and in registration with hole series 65 and hole series 67 in gussets 60. Gussets 60 are then affixed to webs 21 and 71 with fasteners 24 and 74 respectively.

As illustrated in FIG. 8, in addition to the gusset, such as gusset 10, affixing the lower portion of a secondary truss 30 to a primary truss 20 as shown in FIG. 3, a splice plate can be attached to the sides of webs 31 and 21 and affixed in place with fasteners to maintain secondary truss 30 in a desired vertical relationship with respect to primary truss 20.

In the foregoing description, it will be readily appreciated by those skilled in the art that modifications may be made to the invention without departing from the concept disclosed herein. Such modifications are to be considered as included in the following claims, unless these claims expressly state otherwise.

The embodiments of the invention in which an exclusive property or privilege is claimed are defined as follows:

1. A secondary support truss adapted for joining one end thereof to a primary support truss at an intermediate portion of the primary support truss, said secondary support truss comprising:

upper and lower chord members defining upper and lower boundaries of said truss;

web members extending between said upper and said lower chords for supporting said chord members in a fixed relationship when said secondary support truss is at least partially supported at said one end thereof; and a gusset at said one end of said secondary support truss wherein said gusset further comprises a finger portion extending beyond said one end of said secondary truss and a tab substantially co-planar with and extending from said finger portion, said finger portion and said one end of said secondary truss defining a slot therebetween, said slot adapted to receive at least one element of the primary support truss for supporting said end of said secondary truss thereon without fastening said secondary truss to the primary truss and further adapted for permanent attachment to the primary truss, said tab constructed for permanent attachment to an other primary support truss adjacent the primary support truss.

2. A secondary support truss adapted for joining one end thereof to a primary support truss at an intermediate portion of the primary support truss, said secondary support truss comprising:

upper and lower chord members defining upper and lower boundaries of said truss;

web members extending between said upper and said lower chords for supporting said chord members in a fixed relationship when said secondary support truss is at least partially supported at said one end thereof; and a gusset at said one end of said secondary support truss wherein said gusset further comprises a finger portion extending beyond said one end of said secondary truss, said finger portion being formed at an angle with respect to said secondary support truss for abutting said one end of said secondary support truss to the primary support truss at an angle other than a right angle, said finger portion further being adapted to hangingly engage at least one element of the primary support truss for supporting said end of said secondary truss thereon without fastening said secondary truss to the primary truss and further adapted for permanent attachment to the primary truss.

3. A secondary support truss as claimed in claim 2 wherein said one end of said secondary truss and said finger portion define a slot therebetween, said slot adapted to receive at least one element of the primary support truss for supporting said secondary support truss thereon.

4. A secondary support truss as claimed in claim 3 wherein said gusset further comprises a body portion and said finger portion and wherein said body portion is abutted against and fastened to a side of said secondary support truss at said one end thereof.

5. A secondary support truss as claimed in claim 4 wherein said gusset comprises two gussets, each of said gussets abutted against and fastened to opposite sides of said secondary support truss at said one end thereof, said finger portions of said gussets being substantially parallel and defining a channel therebetween for receiving a web member of the primary truss.

6. A secondary support truss as claimed in claim 3 further comprising a tab substantially co-planar with and extending from said finger portion and adapted for attaching to an other primary support truss adjacent the primary support truss.

7. A secondary support truss adapted for joining one end thereof to a primary support truss at an intermediate portion of the primary support truss, said secondary support truss comprising:

upper and lower cord members defining upper and lower boundaries of said truss;

web members extending between said upper and said lower cords for supporting said cord members in a fixed relationship when said secondary support truss is at least partially supported at said one end thereof; and two gussets at said one end of said secondary support truss, each of said gussets abutted against and fastened to opposite sides of said secondary support truss at said one end thereof, each of said gussets further comprising a finger portion extending beyond said one end of said secondary truss, said finger portion being adapted to hangingly engage at least one element of the primary support truss for supporting said end of said secondary truss thereon without fastening said secondary truss to the primary truss and further adapted for permanent attachment to the primary truss, each said finger portion of said gussets being substantially parallel one to the other and describing a channel therebetween for receiving a web member of the primary truss.

8. A truss system for supporting building roofs comprising:

at least one primary support truss having upper and lower primary chord members defining upper and lower boundaries of said primary truss and at least one primary web member extending between said upper and lower primary chord members supporting said primary chord members in a fixed relationship at least one secondary support truss having one end thereof joined to said primary support truss, said secondary support truss including upper and lower secondary chord members defining upper and lower boundaries of said secondary truss and including secondary web members extending between said upper and said lower chords for supporting said secondary chord members in a fixed relationship when said secondary support truss is at least partially supported at said one end thereof; and a gusset at said one end of said secondary support truss wherein said gusset further comprises a finger portion extending beyond said one end of said secondary truss, said finger portion including a downwardly depending finger and hangingly engaging an upper edge of at least one chord of said primary support truss for supporting said end of said secondary truss thereon without fastening said secondary truss to said primary truss and attached to a face of said at least one primary web member of said primary truss substantially along an intersection of a vertical centroidal plane of said primary truss and said face of said at least one web member of said primary truss.

9. A truss system as claimed in claim 8 wherein said secondary support truss and said finger portion are substantially co-planar for abutting said secondary support truss at substantially a right angle with said primary truss.

10. A truss system as claimed in claim 9 wherein said one end of said secondary truss and said finger portion define a slot therebetween, said slot adapted to receive at least a portion of said lower primary chord of said primary truss for supporting said secondary truss thereon.

11. A truss system as claimed in claim 10 wherein said gusset further comprises a body portion and said finger portion and wherein said body portion is abutted against and fastened to a side of said secondary support truss at said one end thereof.

12. A method for joining one end of a secondary support truss to a primary support truss at an intermediate portion of said primary support truss, said method comprising the steps of:

positioning a gusset adjacent a side of said secondary support truss at said one end of said secondary support truss wherein a finger portion having a downwardly depending finger of said gusset extends beyond said one end of said secondary truss;

aligning said secondary support truss in a substantially vertical plane and substantially at a right angle to said primary support truss;

raising said secondary support truss slightly vertically higher than the position of said primary support truss;

abutting said one end of said secondary support truss to said primary support truss; engaging said downwardly depending finger with an upper edge of an element of said primary support truss; and lowering said secondary support truss to the level of said primary support truss;

attaching said finger portion to said primary support truss.

13. The method according to claim 12 wherein said aligning step comprises aligning said secondary support truss in a substantially vertical plane and at an angle other than a right angle to said primary support truss.

\* \* \* \* \*